Nov. 7, 1967   R. G. HOCH ETAL   3,351,155
ADJUSTABLE JET SILENCER NOZZLE WITH CONTROLLED
FLAPS AND FOLLOWER FLAPS
Filed Oct. 20, 1965
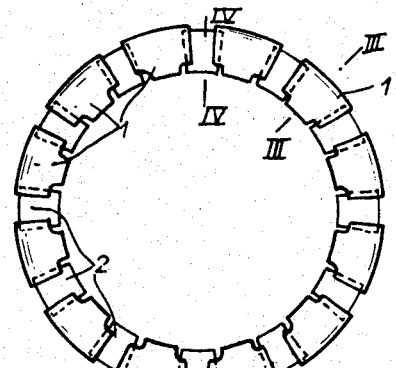
Fig.: 1
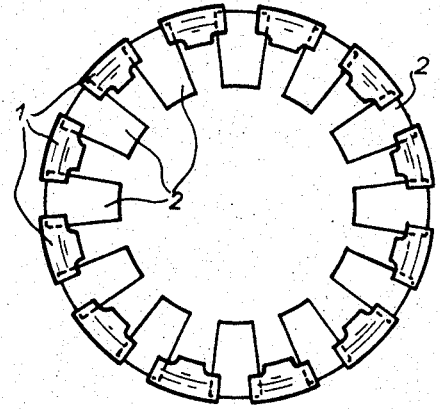
Fig.: 2
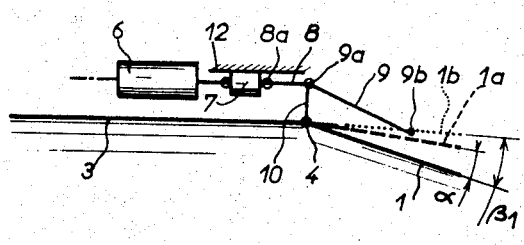
Fig.: 3
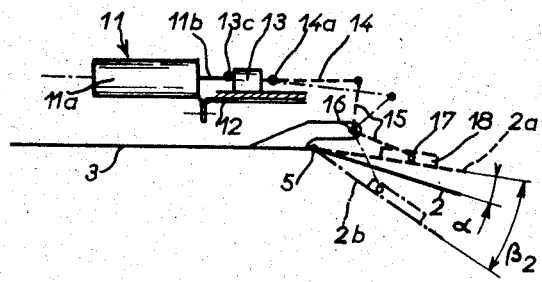
Fig.: 4
Inventors
René Gérard Hoch
Louis Francois Jumelle
Jean Marie Minos
Stevens, Davis, Miller & Mosher
Attorneys United States Patent Office 3,351,155
Patented Nov. 7, 1967

3,351,155
ADJUSTABLE JET SILENCER NOZZLE WITH CONTROLLED FLAPS AND FOLLOWER FLAPS
René Gérard Hoch, Dammarie-les-Lys, and Louis Francois Jumelle and Jean Marie Minos, Paris, France, assignors to Societe Nationale d'Etude et de Construction de Moteurs d'Aviation, Paris, France, a company of France
Filed Oct. 20, 1965, Ser. No. 498,259
Claims priority, application France, Nov. 3, 1964, 993,637
4 Claims. (Cl. 181—51)

This invention relates to the regulation of aircraft turbojet pipes with an adjustable nozzle section.

Jet pipes are already known, in which the exhaust nozzle section comprises a plurality of flaps or petals of the so-called "controlled" type, distributed around the periphery of the jet pipe and hinged about axes tangential to said periphery and also comprising a plurality of flaps or petals of the so-called "follower" or "repeater" type each arranged between two adjacent controlled flaps and resting on the inner surface of the latter and likewise hinged about axes tangential to the jet pipe periphery, means being provided for controlling the pivotal motion of the controlled flaps. The follower flaps are maintained firmly in contact with the inner surface of the controlled flaps by the pressure of the jet stream and create an effective seal. In known arrangements the controlled flaps include on each side a bifurcated rim that frames the periphery of the adjacent follower flap.

In jet pipes of this type, the nozzle section is ordinarily adjusted by a regulating device that acts on said section by causing the controlled flaps to pivot, whereas the follower flaps remain firmly up against the controlled flaps by reason of the jet stream pressure, in whatever position the latter flaps occupy.

The invention has for its object to provide an improved jet pipe of the foregoing type, in which adjustment is indirect, that is to say is a function of parameters external to the jet pipe, such as the ratio between pressures at the outlet and the intake of a compressor or the expansion ratio in the turbine. This improvement facilitates the obtaining of a silencer effect, more especially at take-off, with a regulating device acting on the jet pipe section both when the silencer effect is employed and when it is not.

According to the invention the silencer effect is achieved by causing the follower flaps to pivot towards the interior of the pipe by means of a control device of the "On-Off" quick-acting type until they reach a fixed active position whatever the aperture of the jet pipe may be, jet pipe section adjustment being obtained solely by a regulating device that causes the controlled flaps to articulate.

When the control device of the follower flaps is actuated to obtain the silencer effect, the follower flaps move in towards the interior of the pipe, so causing, in a known manner, a return movement of air within the jet stream, and the latter undergoes a striction effect corresponding to the effective nozzle section of the jet pipe. There immediately follows a variation in the parameter or parameters of the regulating device, and the latter immediately intervenes to open the controlled shutters so as to re-establish the correct nozzle section, and then continues to act on said controlled flaps so as to maintain this nozzle section at the required value. When the silencer becomes superfluous, the control device of the follower flaps is actuated, so that it frees the follower flaps, which are again pressed against the controlled flaps by the pressure of the jet, and the regulating device immediately intervenes once more to give the nozzle section the required effective value.

The "On-Off" quick-acting control device of the follower flaps may be secured to a portion of the fixed structure of the jet pipe, in which case the follower flaps in the silencer position are moved inwards at a fixed angle in relation to said fixed structure, so that when the control device has been actuated to obtain the silencer effect the relative penetration inwards of the follower flaps in relation to the controlled flaps increases, since the regulating device forthwith draws the controlled flaps back so as to compensate for the reduction in effective section due to the inward penetration of the follower flaps.

The position of the set of flaps is modified in an appropriate manner by the section regulating device with which the jet pipe is normally equipped and which continuously adjusts the jet pipe in the same manner, whether the silencer be in operation or not.

It is evident that, in an arrangement according to the invention, each of the sides of the control flaps is no longer provided with the double bifurcated rim that frames the periphery of the adjacent follower flap, as in known arrangements without a silencer, but is provided with a rim which is plain on the outside and, if so required, an abutment device on the inside, the follower flap, as it functions to provide the silencer effect, requiring freedom to move away from the controlled flaps and to penetrate inwards into the jet stream.

A jet pipe embodying the invention will now be described, by way of example with reference to the accompanying drawings, in which:

FIGURE 1 is a diagrammatic representation of a jet pipe according to the invention viewed from the rear end in its normal arrangement, FIGURE 2 is a view analogous to FIGURE 1 and showing the jet pipe in an arrangement with the silencer operating, FIGURES 3 and 4 are diagrammatic views in section on the lines III—III and IV—IV, respectively, of FIGURE 1.

The jet pipe shown comprises at its rear, in an already known manner, a double circle of controlled flaps 1 and follower flaps 2 hinged to the periphery of the body 3 of the pipe on axes 4 and 5, respectively, the follower shutters 2 being maintained firmly, by the pressure of the jet stream ejected from the pipe, against the inner surfaces of the two adjacent flaps 1. The flaps 1 are controlled in an already known manner by a regulating device that acts on a circle of jacks 6 attached to the jet pipe structure and which cause a ring 7 to slide along the tube, the ring actuating each flap 1 by rod linkage comprising a rod 8 hinged at 8a on the ring 7 and a connecting rod 9 hinged at 9a on the rod 8 and at 9b on the flap 1, the hinge 9a being supported by a rocker arm 10 hinged at the axis 4 of the flap.

The mode of operation of this jet pipe is well known. FIGURES 1, 3 and 4 show the flaps 1 and 2 in the normal maximum closed position, corresponding for example to take-off. At 1a and 2a (FIGURES 3 and 4) there are shown in broken lines the respective flaps 1 and 2 in the normal maximum aperture position, and the maximum angle of movement of the flaps in this known arrangement is denoted by α.

The silencer effect, in the illustrated embodiment, is obtained by causing the flaps 2 to pivot towards the interior of the pipe by means of jacks 11 that are arranged in a circle as are the jacks 6, cylinders 11a of the jacks being attached to an annular support 12 that is fixed in relation to the jet pipe. Rods 11b of the jacks 11 are hinged at 13c to a ring 13 analogous to the ring 7 associated with the flaps 1 and which itself also slides along the jet pipe. The ring 13 is linked to each of the flaps 2 by an arrangement consisting of a connecting rod 14 hinged at 14a on said ring and at 14b on one arm of a bellcrank lever 15 which turns about a fixed point 16 on the jet pipe structure which may be distinct from the axis of articulation 5 of the flap 2. The other arm of the lever 15 is hinged to a sliding member 17 that co-operates with a guide 18 attached to the outer surface of the flap 2.

Means (not shown) are provided for supplying, when so desired, a pressurised fluid into the jacks 11 in order to bring about their extension. In the position shown by unbroken lines in FIGURE 4, the cylinders 11a of the jacks 11 are not under pressure, they being for example connected to a fluid return pipe, and the follower flaps 2 are free to be maintained firmly against the inner surface of the two adjacent flaps 1 by the action of the jet stream pressure, in the usual manner.

The pivotal movement of the controlled flaps 1 is therefore controlled by the set of jacks 6 through the intervention of the reversible transmission system comprising the ring 7 and the sets of rods 8, 9, 10, the jacks 6 themselves being controlled by an indirect regulating system, that is to say, one operating as a function of parameters external to the jet pipe section. Such a system and its manner of acting on the jacks 6 is well-known in itself, and for this reason it is unnecessary to indicate it in the drawings or to describe it in detail. The silencer control means comprise the set of jacks 11, the reversible transmission system comprising the ring 13 and the sets of connecting rods 14 and bellcrank levers 15, the feed arrangement allowing the jacks 11 to be supplied with pressurised fluid which effects their extension as far as the full stroke of their pistons, and a venting arrangement allowing the fluid to run out of the jacks 11, for example into a return pipe. The transmission system 14, 15 causes the follower flaps 2 to pivot as far as their position 2b when the jacks 11 are actuated by the feed arrangement, and retracts the rods 11b of the jacks 11 towards the left (FIGURE 4) when the follower flaps pivot towards their position 2 or 2a under the action of the jet stream pressure, the venting device being actuated so as to give the fluid free passage. The feed arrangement and the venting arrangement are actuated when so desired, according to whether the silencer effect is required or not. Such arrangements are well known to specialists in this field and it therefore appears unnecessary to show or describe them in detail; they may, for example, include a cock allowing the jacks 11 to communicate with a source of pressurised fluid and another cock allowing said jacks to communicate with the return pipe, or, indeed, a single three-way cock fulfilling the same function.

To obtain the silencer effect, the jacks 11 are put under pressure whereupon they extend to their maximum and shift the ring 13 towards the rear. The ring 13 moves each connecting rod 14 which causes the lever 15 to turn about its axis 16; this lever effects the pivoting of the corresponding flap 2 towards the interior with the co-operation of the sliding member 17 and the guide 18. The flaps 2 thus assume the position 2b, shown in broken lines in FIGURE 4, in which they are at full penetration. From this there results a striction of the jet stream which brings about the immediate operation of the regulating device for opening the jet pipe nozzle, this regulating device actuating the jacks 6 in the direction that causes the ring 7 to slide to the front (that is, towards the left in FIGURE 3) and consequently causes the flaps 1 to turn towards the open position, the flaps 2 remaining fixed.

It will be seen that, although the regulating device acts solely on the controlled flaps 1, the load of the engine is adjusted alone by the normal regulating device which indirectly determines (by any known procedure) the jet pipe sections that are effective both when the flaps 2 follow the movement of the controlled flaps 1 in the normal arrangement (FIGURE 1), at which time they behave as conventional follower flaps, and when they are arranged in the silencer position (FIGURE 2), although in the latter instance they are brought up to a fixed stop, the controlled flaps then alone undergoing the section adjustment required by the normal regulating device.

In this last arrangement, the controlled flaps 1 must be able to open more than in the conventional arrangement, so as to be capable of compensating for the penetration inwards of the flaps 2. In FIGURE 3, the broken line 1b, shows the maximum open position of the flaps 1, and the total angle of movement of these flaps is denoted by $\beta 1$. In FIGURE 4, $\beta 2$ denotes the total angle of movement of the flaps 2 between the position 2a (maximum aperture in the normal arrangement without silencer) and the position 2b (closed in the silencer arrangement). The angle $\beta 2$ is distinctly larger than the angle $\beta 1$, that is to say, the controlled flaps 1 only pivot to a limited degree, whereas the follower flaps 2 pivot a considerable amount, under the action of the silencer control device, so as to arrive at their silencer position 2b in which each follower flap is inclined to the rear and to the interior by a substantial angle in relation to the pipe. It will be noted that the controlled flaps 1 do not assume the position 1a permanently when the silencer is put into operation at take-off, since, as has been shown, the regulating device quickly opens the jet nozzle and moves the controlled flaps to the position 1b, for example, so as to compensate for the reduction in effective section brought about by the penetration inwards of the flaps 2.

It will be evident that the embodiments described are by way of example only and that they may be modified, more especially by substituting equivalent technical means, without however lying outside the scope of the invention claimed.

What is claimed is:

1. In an aircraft turbojet, the combination of a jet pipe with adjustable nozzle section appropriate for producing a jet stream, and having a jet pipe duct; a plurality of controlled flaps; a plurality of follower flaps equally spaced at an angle to the periphery of the duct and mounted to pivot on the nozzle edge of the duct about pivot axes tangential to said nozzle edge, each follower flap being arranged between two adjacent controlled flaps and being adapted to be maintained firmly against the inner surface of said two controlled flaps by the pressure of the jet stream; control means for the jet pipe adapted to pivot the controlled flaps together in dependence upon a regulating system operating as a function of parameters external to the nozzle section of the jet pipe; and silencer control means adapted to pivot the follower flaps together until they attain an active position in which each of said follower flaps is inclined towards the rear and towards the interior of the pipe at a fixed angle in relation to the duct, said fixed angle being sufficient for the follower flaps to penetrate the jet stream to provide a substantial silencer effect.

2. A jet pipe for exhausting a jet stream, comprising a jet pipe duct; a plurality of controlled flaps; a plurality of follower flaps equally spaced at an angle to the periphery of the duct and mounted to pivot on the nozzle edge of the duct above pivot axes essentially tangential to said nozzle edge, external control means adapted to pivot the controlled flaps to a limited degree so as to adjust the nozzle section of the jet pipe, each follower flap being arranged between two adjacent controlled flaps and being adapted to be maintained firmly against the inner surfaces of said adjacent controlled flaps; and control means adapted to pivot the follower flaps together until they attain an active position in which each follower flap is inclined towards the rear and towards the interior of the pipe at a considerable angle in relation to the duct.

3. A jet pipe according to claim 2, wherein the control means for the follower flaps comprise a plurality of jacks; feed means adapted to feed the jacks with pressurised fluid in order to move the jacks up to a fixed stop position; a transmission system adapted to transmit the movement of the jacks to the follower flaps to cause the latter to pivot into an active position; and venting means adapted to allow the fluid to escape from the jacks, said transmission system being also adapted to yield to the pivoting movement of the follower flaps by moving the jacks, while said venting means provides an escape for the fluid.

4. A jet pipe according to claim 3, wherein said transmission system comprises a ring encircling the jet pipe duct and mounted to slide axially in relation to the duct and adapted to be displaced by the jacks axially in relation to the duct, and a plurality of bell-crank levers each having a fulcrum slightly to one side of the pivot axis of a corresponding follower flap, a first arm of said level being hinged on the ring with the interposition of a connecting rod, and a second arm hinged on a sliding member cooperating with a guide fixed to said follower flap.

References Cited
UNITED STATES PATENTS

| | | | |
|---|---|---|---|
| 2,886,946 | 5/1959 | Parker | 181—33 |
| 2,997,842 | 8/1961 | Colley | 239—265.37 |
| 3,057,150 | 10/1962 | Horgan | 239—265.41 X |
| 3,263,931 | 8/1966 | Bartek et al. | 181—33 |

ROBERT S. WARD, JR., *Primary Examiner*